United States Patent [19]
Schiffer

[11] Patent Number: 4,868,018

[45] Date of Patent: Sep. 19, 1989

[54] ARTIFICAL MARBLE

[76] Inventor: Henry Schiffer, 21835 El Bosque Way, Boca Raton, Fla. 33433

[21] Appl. No.: 186,608

[22] Filed: Apr. 27, 1988

[51] Int. Cl.$^4$ .......................... B05D 1/36; B05D 5/00; B05D 7/00; B32B 17/10

[52] U.S. Cl. ...................................... 428/15; 427/263; 427/268; 427/281; 427/287; 427/386; 427/407.1; 428/415

[58] Field of Search ............... 427/263, 268, 281, 386, 427/407.1, 261, 262, 287; 428/15, 415

[56] References Cited

U.S. PATENT DOCUMENTS 3,471,312 10/1969 Muenchinger et al. ......... 427/261 X
4,721,634 1/1988 McKinnon ........................... 427/263

*Primary Examiner*—Michael Lusignan
*Attorney, Agent, or Firm*—Joseph Zallen

[57] ABSTRACT

Hard, durable, water-resistant simulated marble products are made by coating a support surface with a mixture of epoxy resin, epoxy resin hardener, pigment and a powdered material such as portland cement, powdered clay, a mix of portlant cement and lime, powdered lime, a mix of portland cement and silica sand or mixtures thereof. After the coating is applied a water-based acrylic polymer with pigment or pigments of selected color is applied with a brush or similar means in selected areas and then troweled or feathered to give the desired marbelizing effect. The product is then allowed to harden. The resultant product is hard, durable, water-resistant, easily washable and resembles marble.

8 Claims, No Drawings

ARTIFICAL MARBLE

BRIEF DESCRIPTION OF INVENTION

This invention relates to novel simulated marble products and methods for making them.

One object of this invention is to provide novel simulated marble products which can be made by relatively unskilled labor on the job site or in a factory.

Other objects and advantages of this invention are apparent from the description and claims which follow.

SUMMARY OF INVENTION

The simulated marble products of this invention are made by first coating a support surface with a thick mixture of epoxy resin, epoxy hardener, pigment, and an essentially inorganic powdered material such as portland cement, powdered marble, powdered clay, a mix of portland cement and lime, powdered lime, or a mix of portland cement and silica sand. After the coating is spread over the surface a water-based acrylic polymer with pigment or pigments of selected color is applied with a brush or similar means in selected areas and then troweled or feathered to give the desired marbleizing effect. The product is then allowed to dry and set, typically in about twenty four hours.

The proportions of the various ingredients may be widely varied. The coating mixture preferably has a viscosity resembling pancake mix so that it can be spread evenly. Excess hardener should be avoided to prevent too-quick resin curing. The amount of pigment to be used in the mixture is judged by the depth of color desired. The amount of powdered material to be mixed with the resin is also variable according to the viscosity and hardeners desired.

The resultant product is hard, durable, water-resistant, easily washable and resembles marble. The products of this invention may be made on the job or preformed in factories and used wherever a marble-like surface is desired.

SPECIFIC EXAMPLES OF INVENTION

EXAMPLE 1

About three parts by volume of liquid epoxy resin and one part of amine hardener are mixed together for about three minutes. Then about four parts of a powder comprising about half portland cement and half silica sand, and about 0.1 parts of pigment are mixed into the mixture. The thick mixture is then spread evenly on a support surface such as wood, plywood, masonite, or concrete to form a smooth, relatively thin layer. After application of the coating, but before it dries or hardens, an acrylic polymer emulsion with pigment, such as are commonly available as acrylic paints, is selectively applied by brushng, troweling, or feathering to provide the marbleing effect. The resultant product is then allowed to dry and cure for an extended period, as for example, twenty-four hours.

The resultant product resembles marble but is durable, water-resistant, and easily washable. Enclosed photographs A, B, C, D, and E are of panels of the simulated marble of this invention on Masonite, namely black, blue, tan, pink and multiple color tiles.

EXAMPLE 2

The procedure of Example 1 is repeated except that the support surface is a sheet of glass. The resultant product is translucent and of striking beauty. Enclosed photograph F shows two panels of the simulated marble on glass.

I claim:

1. A method of providing a durable coating resembling marble on a support surface, comprising the steps of applying to the surface a coating comprising a mixture of effective amounts of liquid epoxy resin, epoxy hardener, pigment and essentially inorganic powdered material, selectively applying to the coating before it dries or hardens a pigmented acrylic polymer emulsion to provide the desired ornamental appearance and then pemitting the coating to harden.

2. A method of providing a durable coating resembling marble on a support surface, comprising the steps of applying to the surface a coating comprising a mixture of effective amounts of liquid epoxy resin, epoxy hardener, and a powdered material selected from the class consisting of a mixture of portland cement and silica sand, a mixture of portland cement and lime, portland cement, lime, powdered marble, clay and mixtures thereof, and then selectively applying to the coating before it dries or hardens, an acrylic polymer emulsion with pigment to provide the desired ornamental appearance, and then permitting the coating to harden.

3. The method of claim 1 wherein the powdered material is a mixture of portland cement and silica sand.

4. The method of claim 1 wherein the support surface is a sheet of glass.

5. A product made by the method of claim 1.

6. A product made by the method of claim 2.

7. A product made by the method of claim 3.

8. A product made by the method of claim 4.

* * * * *